(12) United States Patent
Yuan et al.

(10) Patent No.: US 9,259,673 B2
(45) Date of Patent: Feb. 16, 2016

(54) ASSEMBLY MACHINE FOR DISPOSABLE SYRINGE-DRIVEN FILTER

(71) Applicants: Jianhua Yuan, Guangzhou (CN); Yejames Yuan, Guangzhou (CN)

(72) Inventors: Jianhua Yuan, Guangzhou (CN); Yejames Yuan, Guangzhou (CN)

( * ) Notice: Subject to any disclaimer, the term of this patent is extended or adjusted under 35 U.S.C. 154(b) by 360 days.

(21) Appl. No.: 13/903,661

(22) Filed: May 28, 2013

(65) Prior Publication Data

US 2013/0255051 A1    Oct. 3, 2013

Related U.S. Application Data

(63) Continuation of application No. PCT/CN2012/072162, filed on Mar. 10, 2012.

(30) Foreign Application Priority Data

Jan. 17, 2012 (CN) .......................... 2012 1 0013935

(51) Int. Cl.
| | |
|---|---|
| *B01D 29/88* | (2006.01) |
| *B01D 24/00* | (2006.01) |
| *B01D 25/00* | (2006.01) |
| *B01D 27/00* | (2006.01) |
| *B23P 21/00* | (2006.01) |

(52) U.S. Cl.
CPC .............. *B01D 29/88* (2013.01); *B01D 24/001* (2013.01); *B01D 25/001* (2013.01); *B01D 27/005* (2013.01); *B23P 21/002* (2013.01); *Y10T 29/53961* (2015.01)

(58) Field of Classification Search
CPC .. B01D 24/001; B01D 25/001; B01D 27/005; B01D 29/88; B23P 21/002; Y10T 29/53961
USPC ............................................ 422/64; 29/281.1
See application file for complete search history.

(56) References Cited

U.S. PATENT DOCUMENTS 6,267,927 B1* 7/2001 Pomar Longedo et al. ..... 422/65

* cited by examiner

*Primary Examiner* — Brian R Gordon
(74) *Attorney, Agent, or Firm* — Myers Wolin, LLC (57) ABSTRACT

An assembly machine for assembling disposable syringe-driven filter is provided, which includes a rack and an automatic controller arranged on the rack. The automatic controller is electrically connected with a rotating table, a first automatic loading mechanism, an automatic filter disc-sucking mechanism, a second automatic loading mechanism, and an automatic unloading mechanism. Using the first and second automatic loading mechanisms, the automatic filter disc-sucking mechanism, and the automatic unloading mechanism, as well as the automatic controller, the assembly machine can realize the automatic loading of the upper cover of a disposable syringe-driven filter, the automatic placing of filter disc, the automatic loading and assembling of the lower cover of filter and the automatic unloading of the disposable syringe-driven filter, so that the automatic production of the disposable syringe-driven filter can be realized.

8 Claims, 8 Drawing Sheets

Fig.8

ASSEMBLY MACHINE FOR DISPOSABLE SYRINGE-DRIVEN FILTER

CROSS REFERENCE TO RELATED APPLICATIONS

The present application is a continuation of PCT/CN2012/072162, filed on Mar. 10, 2012, which claims priority to Chinese Patent Application No. 201210013935.4, filed Jan. 17, 2012, the contents of each of which are incorporated herein by reference.

FIELD OF THE INVENTION

The present invention relates to an automation device, especially to an assembly machine for disposable syringe-driven filter.

BACKGROUND OF THE INVENTION

The disposable syringe-driven filter generally includes an upper cover, a lower cover of disposable syringe-driven filter, and a filter disc which is arranged between the upper cover and the lower cover. Currently, the production of the disposable syringe-driven filter is semi-automatic, and the production process mainly includes three steps of: first, preparing a strip-shaped filter sheet and putting it on a blanking mould to punch a filter disc of a desired shape, then putting the filter disc to a predetermined position of lower cover of disposable syringe-driven filter manually; second, mounting the upper cover of disposable syringe-driven filter to the lower cover of disposable syringe-driven filter manually, then the production of the disposable syringe-driven filter is completed.

The current production of the disposable syringe-driven filter has the following disadvantages: first, the production of the products is semi-automatic, and the semi-finished products need to be carried from a blanking device to an assembly workshop, so that the turnover time of the products during production is extended, so is the production time, thereby leading to a low productivity. In addition, the labor intensity of the workers is increased due to mounting the upper cover of disposable syringe-driven filter onto the lower cover of disposable syringe-driven filter manually; second, since the filter disc is manually put into the lower cover of disposable syringe-driven filter, the phenomenon that filter disc in the lower cover of disposable syringe-driven filter is in an incorrect position occurs frequently during the operation process. Therefore, there are defective products after putting the upper cover onto the lower cover of disposable syringe-driven filter, resulting in a low yield of finished product.

SUMMARY

The technical problem that the present invention aims to solve is to provide an assembly machine for disposable syringe-driven filter which can realize automatic production of the disposable syringe-driven filter as well as improve yield of product.

The technical scheme of the present invention to solve the above-mentioned technical problem is that the invention comprises: a rack, an automatic controller and a rotating table arranged on the rack; wherein a first automatic loading mechanism, an automatic filter disc-sucking mechanism, a second automatic loading mechanism, and an automatic unloading mechanism are all provided above the rotating table; the automatic controller is electrically connected with the rotating table, the first automatic loading mechanism, the automatic filter disc-sucking mechanism, the second automatic loading mechanism, and the automatic unloading mechanism; and a lifting platform is also provided above the rotating table, wherein the first automatic loading mechanism, the automatic filter disc-sucking mechanism, the second automatic loading mechanism and the automatic unloading mechanism are arranged on the lifting platform orderly.

As a further improvement of the technical scheme of the present invention, a first loading guiding rail is arranged within the first automatic loading mechanism, one end of the first loading guiding rail is fixed on the lifting platform and the other end is hanging; a first loading sliding block is arranged on the first loading guiding rail; and a first loading arm is arranged on the lower end of the first loading sliding block.

As a further improvement of the technical scheme of the present invention, a filter disc-sucking guiding rail is arranged within the automatic filter disc-sucking mechanism, one end of the filter disc-sucking guiding rail is fixed on the lifting platform and the other end is hanging; a filter disc-sucking sliding block is arranged on the filter disc-sucking guiding rail; and a filter disc-sucking end is arranged on the lower end of the filter disc-sucking sliding block.

As a further improvement of the technical scheme of the present invention, a second loading guiding rail is arranged within the second automatic loading mechanism, one end of the second loading guiding rail is fixed on the lifting platform and the other end is hanging; a second loading sliding block is arranged on the second loading guiding rail; and a second loading arm is arranged on the lower end of the second loading sliding block.

As a further improvement of technical scheme of the present invention, an unloading guiding rail is arranged within the automatic unloading mechanism, one end of the unloading guiding rail is fixed on the lifting platform and the other end is hanging; an unloading sliding block is arranged on the unloading guiding rail; and an unloading arm is arranged on the lower end of the unloading sliding block.

As a further improvement of technical scheme of the present invention, a plurality of positioning fixtures are arranged on the rotating table.

As a further improvement of technical scheme of the present invention, the invention further comprises a filter disc punching mould, which is arranged below the hanging end of the filter disc-sucking guiding rail.

As a further improvement of technical scheme of the present invention, the invention further comprises a first feeding mechanism and a second feeding mechanism; wherein a first vibration tray and a first feeding channel are arranged on the first feeding mechanism, one end of the first feeding channel is connected with the first vibration tray and the other end is arranged below the hanging end of the first loading guiding rail; a second vibration tray and a second feeding channel are arranged on the second feeding mechanism, and one end of the second feeding channel is connected with the second vibration tray and the other end is arranged below hanging end of the second loading guiding rail.

The beneficial effects of the present invention are: by means of the first automatic loading mechanism, the automatic filter disc-sucking mechanism, the second automatic loading mechanism and the automatic unloading mechanism, as well as the automatic controller adapted thereto, the invention can realize the automatic loading of the upper cover of disposable syringe-driven filter, the automatic placing of filter disc, the automatic loading and mounting of the lower cover of filter, and the automatic unloading of the disposable syringe-driven filter, so that the automatic production of the disposable syringe-driven filter can be realized.

The present invention is applicable to automatic production of the disposable syringe-driven filter.

DETAILED DESCRIPTION OF THE EMBODIMENTS

Referring to FIG. 1 to FIG. 8, an assembly machine for disposable syringe-driven filter comprising a rack 5, an automatic controller 7 and a rotating table 6 arranged on the rack 5, wherein a first automatic loading mechanism 1, an automatic filter disc-sucking mechanism 2, a second automatic loading mechanism 24, and an automatic unloading mechanism 4 are arranged above the rotating table 6; and the automatic controller 7 is electrically connected with the rotating table 6, the first automatic loading mechanism 1, the automatic filter disc-sucking mechanism 2, the second automatic loading mechanism 24, and the automatic unloading mechanism 4.

Figure 1:
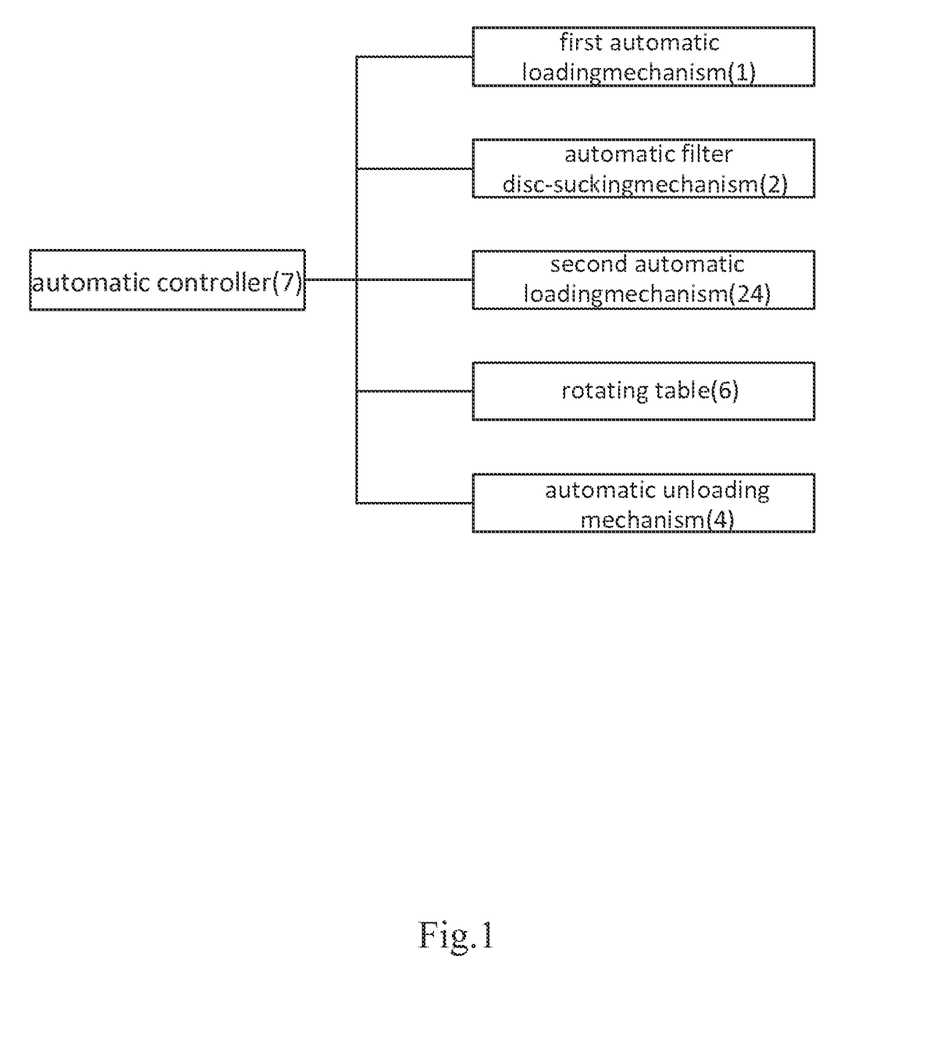
FIG. 1 is a module-connective diagram of mechanisms of the present invention.

By means of the first automatic loading mechanism 1, the automatic filter disc-sucking mechanism 2, the second automatic loading mechanism 24 and the automatic unloading mechanism 4, as well as the automatic controller 7 adapted thereto, and with the automatic controller 7 controlling the first automatic loading mechanism 1, the automatic filter disc-sucking mechanism 2, the second automatic loading mechanism 24 and the automatic unloading mechanism 4, the present invention can realize the automatic loading of the upper cover of disposable syringe-driven filter, the automatic placing of the filter disc, the automatic loading and mounting of the lower cover of filter, so that the automatic production of the disposable syringe-driven filter can be realized.

Figure 2:
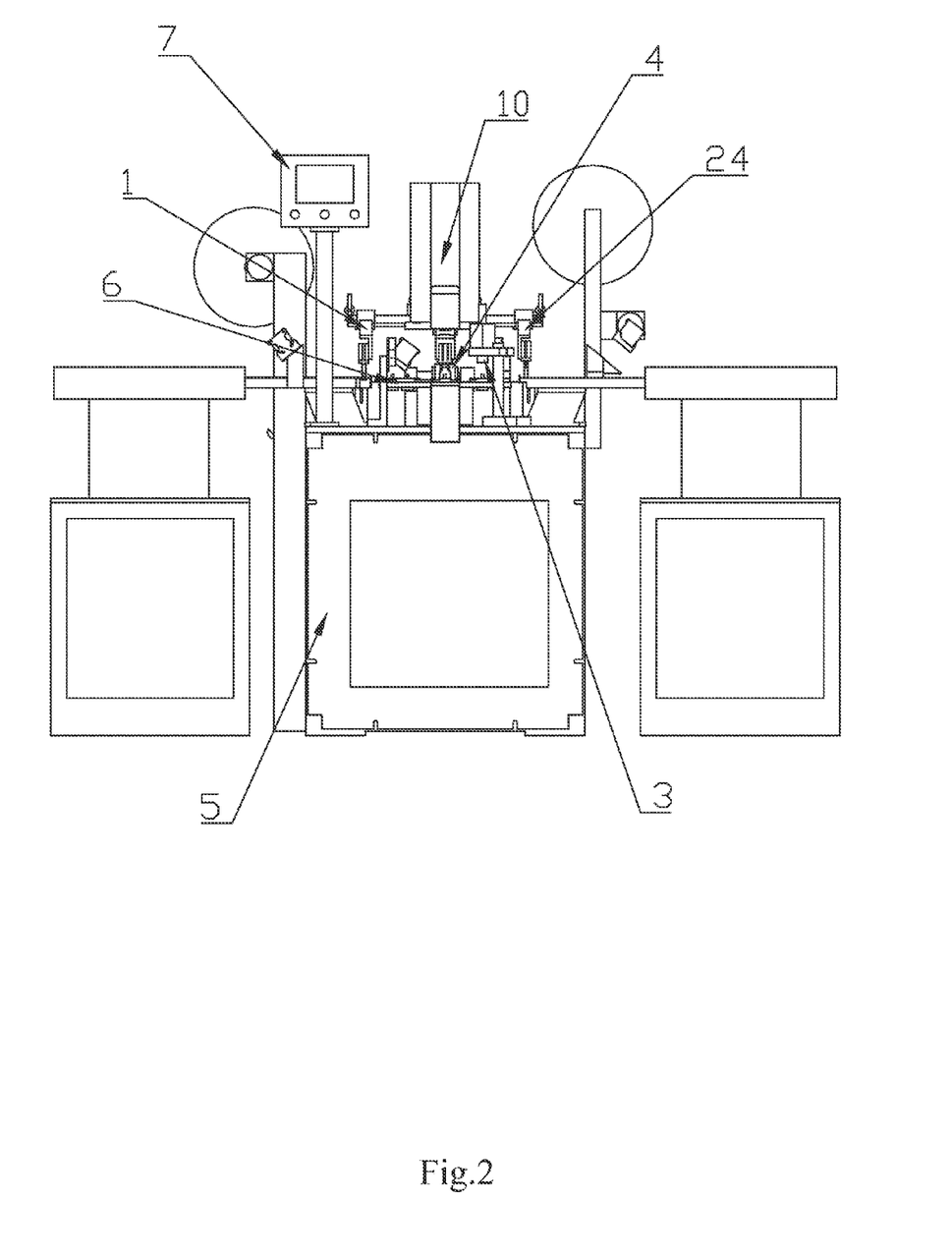
FIG. 2 is a front view of the present invention.
Figure 3:
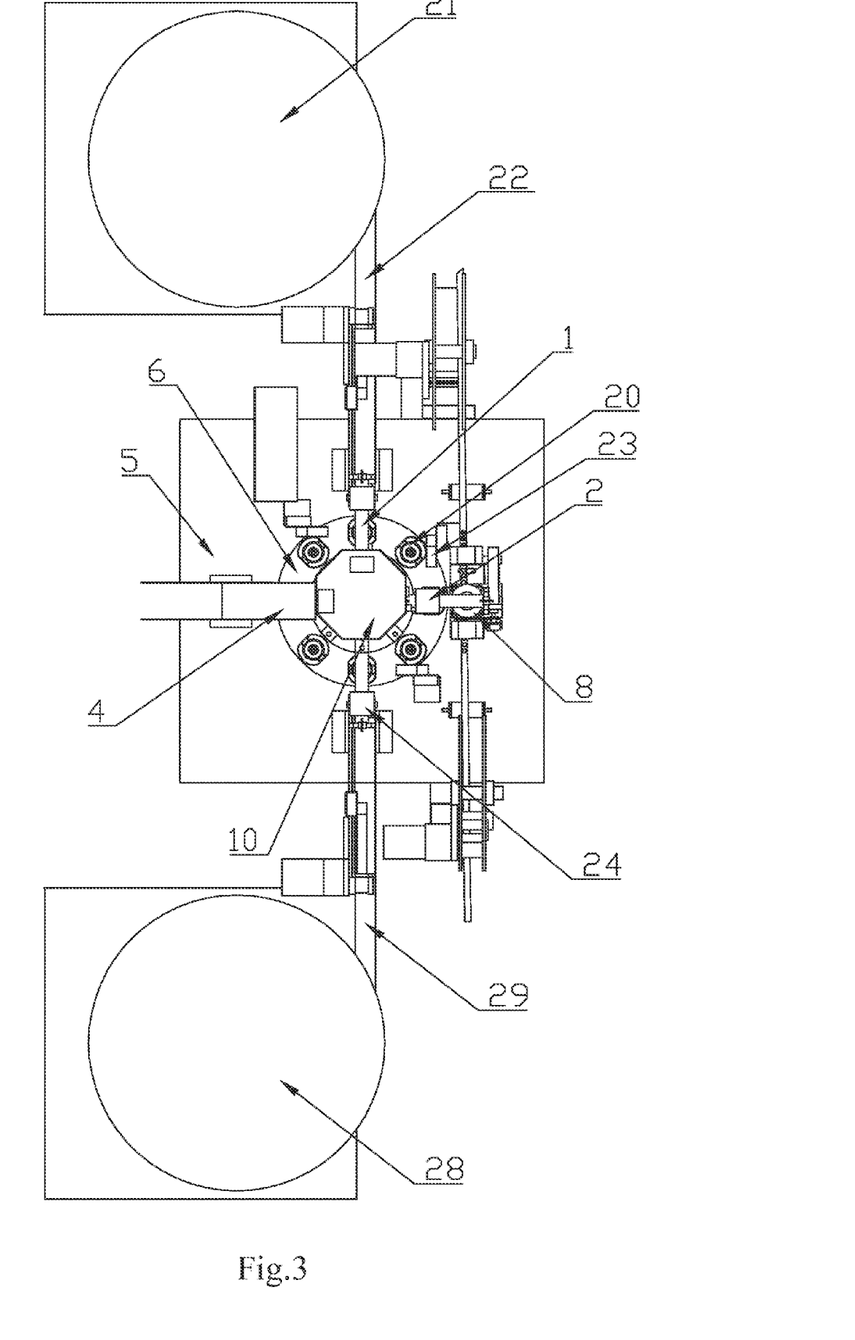
FIG. 3 is a top view of the present invention.
Figure 4:
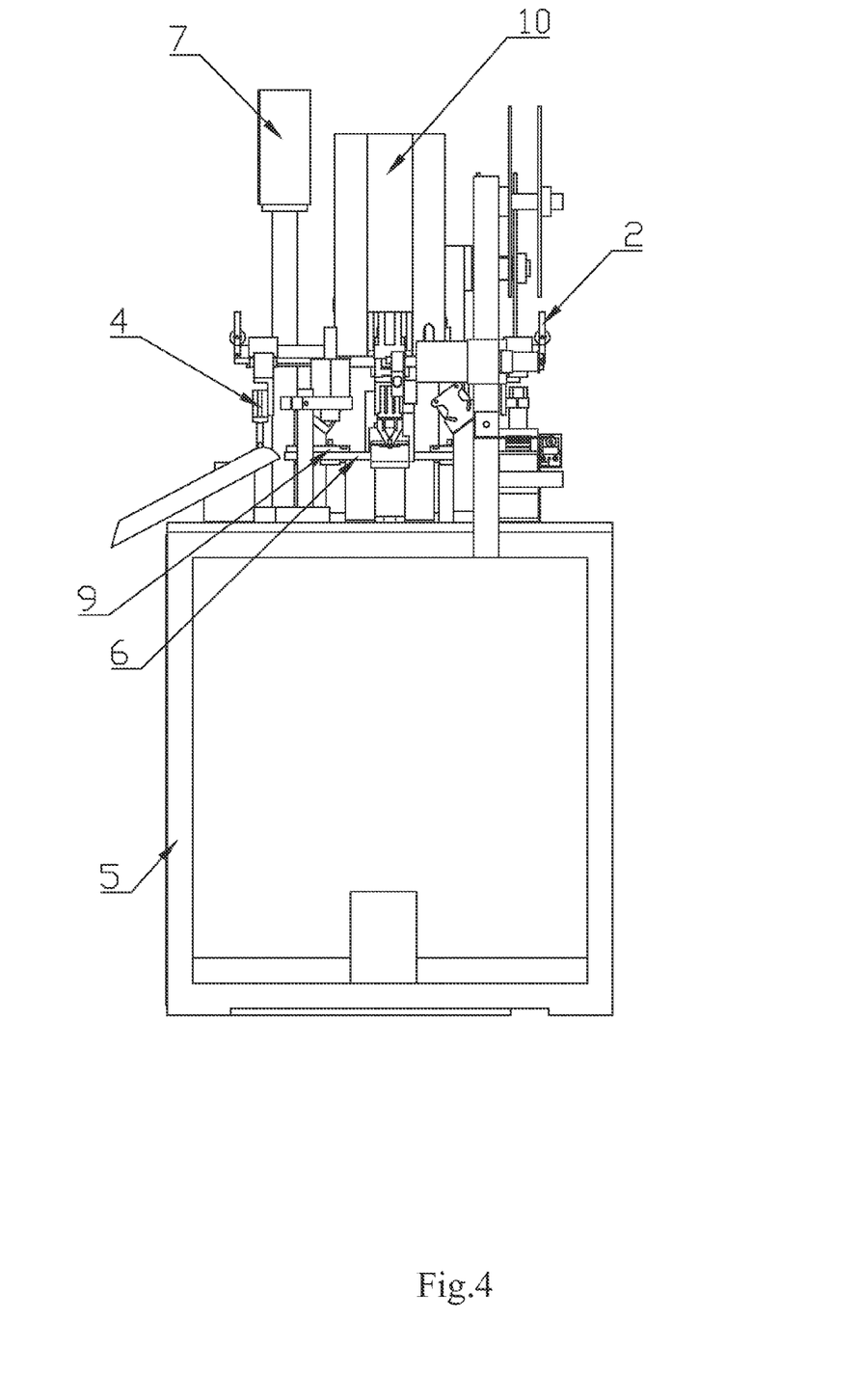
FIG. 4 is a side view of the present invention.

As a preferred embodiment of the present invention, the invention further comprises a lifting platform 10 arranged above the rotating table 6, wherein the first automatic loading mechanism 1, the automatic filter disc-sucking mechanism 2, the second automatic loading mechanism 24 and the automatic unloading mechanism 4 are arranged on the lifting platform 10 orderly, the lifting platform 10 can drive the first automatic loading mechanism 1, the automatic filter disc-sucking mechanism 2, the second automatic loading mechanism 24 and the automatic unloading mechanism 4, so as to realize loading, mounting and unloading of the upper cover, filter disc and the lower cover of disposable syringe-driven filter at the same time under the control of automatic controller 7.

Figure 5:
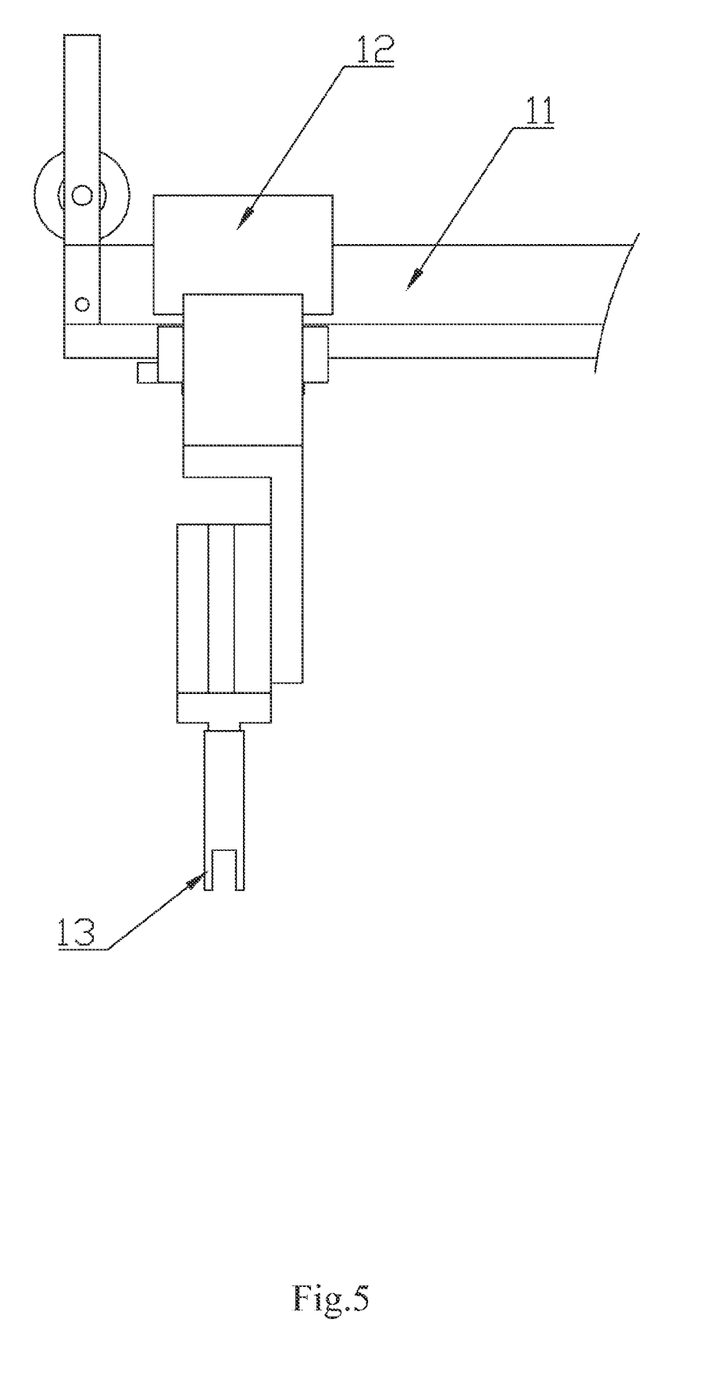
FIG. 5 is a structural schematic diagram of the first automatic loading mechanism of the present invention.

As a preferred embodiment of the present invention, a first loading guiding rail 11 is arranged within the first automatic loading mechanism 1, one end of the first loading guiding rail 11 is fixed on lifting platform 10 and the other end is hanging; a first loading sliding block 12 is arranged on the first loading guiding rail 11, and a first loading arm 13 is arranged on the lower end of the first loading sliding block 12. Under the control of the automatic controller 7, the lifting platform 10 lifts after the first loading arm 13 has grasped the lower cover of disposable syringe-driven filter placed outside the rotating table 6. The first loading sliding block 12 slides on the first loading guiding rail 11 so as to drive the first loading arm 13 to convey the lower cover of disposable syringe-driven filter to a position above the rotating table 6. The lifting platform 10 descends, and the lower cover of disposable syringe-driven filter is released by the first loading arm 13 which will put the lower cover of disposable syringe-driven filter on the rotating table 6. The lifting platform 10 lifts and the first loading arm 13 moves to the position above the lower cover of disposable syringe-driven filter. The lifting platform 10 descends, and the lower cover of disposable syringe-driven filter is grasped by the first loading arm 13. With this cycle, the automatic loading of the lower cover of disposable syringe-driven filter can be realized.

Figure 6:
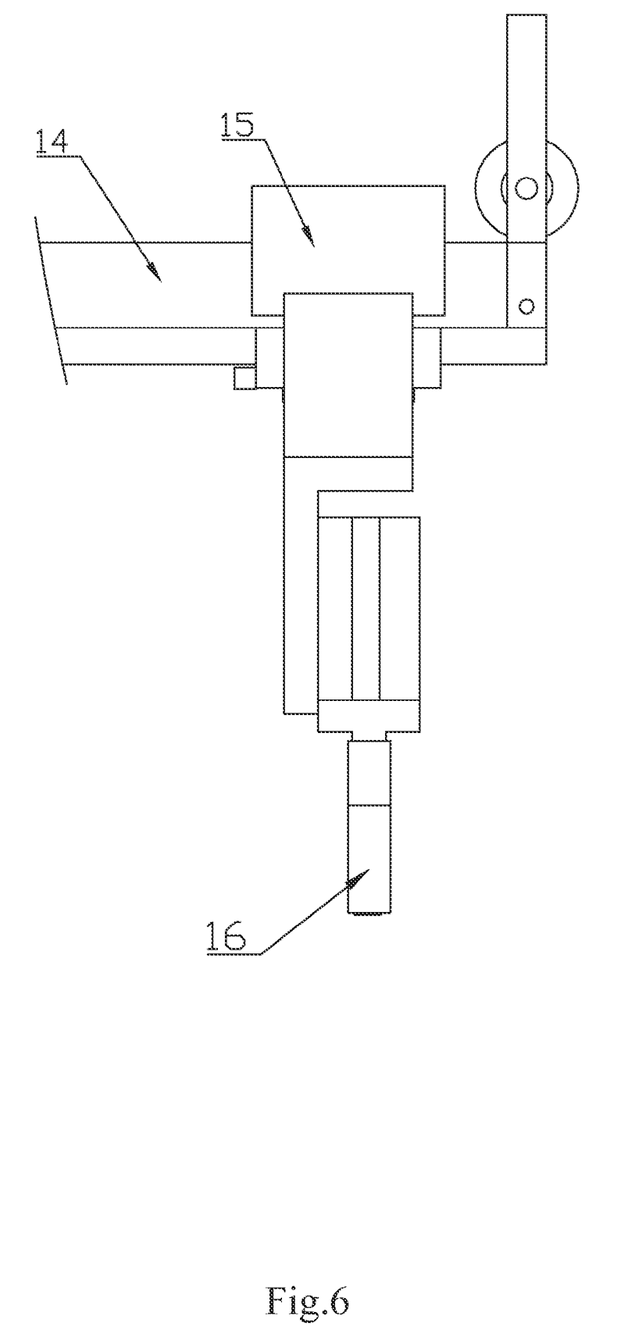
FIG. 6 is a structural schematic diagram of the automatic filter disc-sucking mechanism of the present invention.

As a preferred embodiment of the present invention, a filter disc-sucking guiding rail 14 is arranged within the automatic filter disc-sucking mechanism 2, one end of the filter disc-sucking guiding rail 14 is fixed on lifting platform 10 and the other end is hanging, a filter disc-sucking sliding block 15 is arranged on the filter disc-sucking guiding rail 14, and a filter disc-sucking end 16 is arranged on the lower end of filter disc-sucking sliding block 15. Under the control of the automatic controller 7, the lifting platform 10 lifts after the filter disc-sucking end 16 has sucked the filter disc placed outside the rotating table 6. The filter disc-sucking sliding block 15 slides on the filter disc-sucking guiding rail 14, the lifting platform 10 descends after the filter disc is conveyed to a position above the lower cover of disposable syringe-driven filter. The filter disc can be placed within the lower cover of disposable syringe-driven filter after it is released by the filter disc-sucking end 16. The lifting platform 10 lifts and the filter disc-sucking end 16 moves to a position above filter disc. The lifting platform 10 descends, and the filter disc is sucked the by filter disc-sucking end 16. With this cycle, the automatic loading of the filter disc can be realized.

Figure 7:
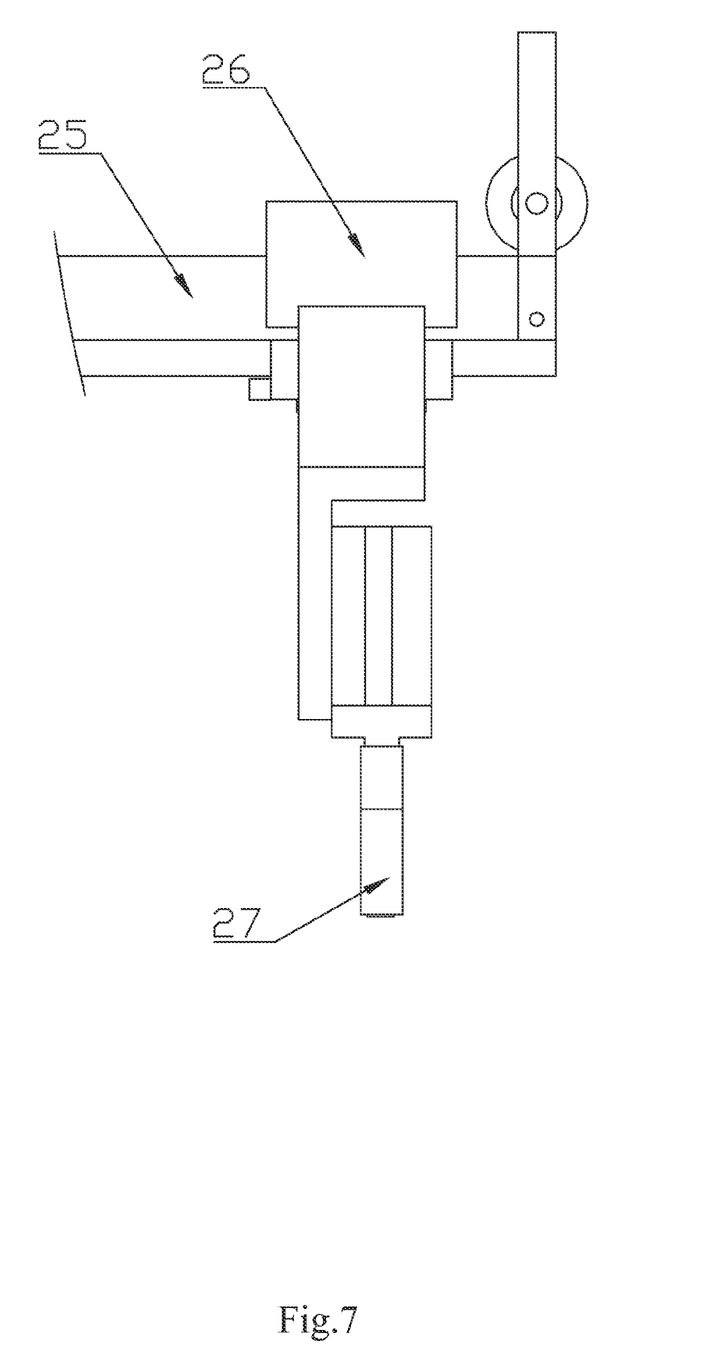
FIG. 7 is a structural schematic diagram of the second automatic loading mechanism of the present invention.

As a preferred embodiment of the present invention, a second loading guiding rail 25 is arranged within the second automatic loading mechanism 24, one end of the second loading guiding rail 25 is fixed on lifting platform 10 and the other end is hanging, a second loading sliding block 26 is arranged on the second loading guiding rail 25, and a second loading arm 27 is arranged on the lower end of the second loading sliding block 26. Under the control of the automatic controller 7, the lifting platform 10 lifts after the second loading arm 27 has grasped the upper cover of disposable syringe-driven filter placed outside rotating table 6. The second loading sliding block 26 slides on the second loading guiding rail 25 so as to drive the second loading arm 27 to convey the upper cover of disposable syringe-driven filter to a position above the lower cover of disposable syringe-driven filter. Then, the lifting platform 10 descends, the upper cover of disposable syringe-driven filter can be mounted on the lower cover of disposable syringe-driven filter after the upper cover of disposable syringe-driven filter is released by the second loading arm 27. The lifting platform 10 lifts and the second loading arm 27 moves to a position above the upper cover of disposable syringe-driven filter. The lifting platform 10 descends, and the upper cover of disposable syringe-driven filter is grasped by the second loading arm 27. With this cycle, the automatic loading, and mounting of the upper cover of disposable syringe-driven filter can be realized.

Figure 8:
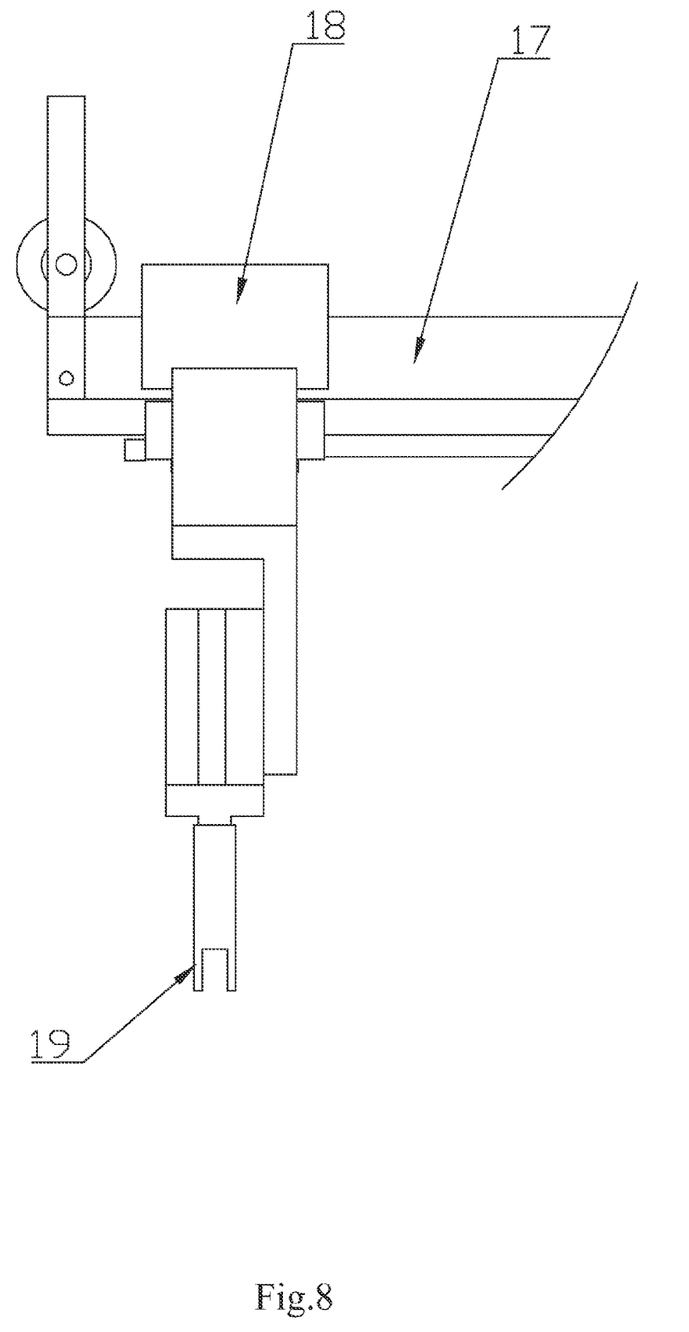
FIG. 8 is a structural schematic diagram of the automatic unloading mechanism of the present invention.

As a preferred embodiment of the present invention, an unloading guiding rail 17 is arranged within the automatic unloading mechanism 4, one end of the unloading guiding rail 17 is fixed on lifting platform 10 and the other end is hanging, an unloading sliding block 18 is arranged on the unloading guiding rail 17, and an unloading arm 19 is arranged on the lower end of the unloading sliding block 18. Under the control of the automatic controller 7, the lifting platform 10 lifts after the unloading arm 19 has grasped the finished disposable syringe-driven filter placed within the rotating table 6. The unloading sliding block 18 slides on the unloading guiding rail 17 so as to drive the unloading arm 19 to convey the finished disposable syringe-driven filter to a position outside the rotating table 6. The finished disposable syringe-driven filter is placed in a collection box after the lifting platform 10 descends. The lifting platform 10 lifts, and the unloading arm 19 moves to a position above the finished disposable syringe-driven filter. The lifting platform 10 descends, and the disposable syringe-driven filter is grasped by the unloading arm 19. With this cycle, the automatic unloading of the disposable syringe-driven filter can be realized.

As a preferred embodiment of the present invention, a plurality of positioning fixtures 20 which are numbered orderly are arranged on the rotating table 6. The lower cover of disposable syringe-driven filter can be placed fixedly on the positioning fixture 20. The positioning fixture 20 can prevent the lower cover of disposable syringe-driven filter from displacing during the rotation of the rotating table 6. The first automatic loading mechanism 1, the automatic filter disc-sucking mechanism 2, the second automatic loading mechanism 24 and the automatic unloading mechanism 4 can be arranged orderly above the positioning fixtures 20 in different positions according to the actual requirement of production process.

In the present invention, a preferred embodiment is that eight positioning fixtures 20 are distributed uniformly on the rotating table 6, and the positions of the positioning fixtures 20 are numbered orderly in a clockwise direction. The first automatic loading mechanism 1 is mounted above the positioning fixture in the first position, the automatic filter disc-sucking mechanism 2 is mounted above the positioning fixture in the third position, the second automatic loading mechanism 24 is mounted above the positioning fixture in the fifth position, and the automatic unloading mechanism 4 is mounted above the positioning fixture in the seventh position. An induction controller 23 is arranged beside the positioning fixture in the second position, the induction controller 23 can detect whether there is a lower cover of the disposable syringe-driven filter on the positioning fixture in the second position, and give feedback to the automatic controller 7 which controls the action of the filter disc sucking mechanism.

As a preferred embodiment of the present invention, the invention further comprises a filter disc punching mould 8 which is arranged on below the hanging end of the filter disc-sucking guiding rail 14. T filter sheet is punched by means of the filter disc punching mould 8 so as to form the filter disc of desired shape. The punched filter disc is conveyed to lower cover of the disposable syringe-driven filter by the filter disc-sucking end 16 under the action of the filter disc-sucking guiding rail 14, the filter disc-sucking sliding block 15 and the lifting platform 10.

Certainly, the present invention further comprises a filter sheet coiling-delivering mechanism and a filter sheet coiling-collecting mechanism, which can cooperate with the punching mould to accomplish the automatic production of the filter disc.

As a preferred embodiment of the present invention, the invention further comprises a first feeding mechanism and a second feeding mechanism, wherein the first feeding mechanism is provided with a first vibration tray 21 and a first feeding channel 22, and one end of the first feeding channel 22 is connected with the first vibration tray 21 and the other end is arranged below the hanging end of the first loading guiding rail 11. While working, the lower cover of disposable syringe-driven filter can be placed within the first vibration tray 21 and conveyed to tail end of the first feeding channel 22 under the action of the first vibration tray 21, and the lower cover of disposable syringe-driven filter at the tail end of the first feeding channel 22 can be grasped by the first loading arm 13 and conveyed to positioning fixture 20. The second feeding mechanism is provided with a second vibration tray 28 and a second feeding channel 29, wherein one end of the second feeding channel 29 is connected with the second vibration tray 28 and the other end is arranged below hanging end of the second loading guiding rail 25. While working, the upper cover of the disposable syringe-driven filter can be placed within the second vibration tray 28, and conveyed to the tail end of the feeding channel 29 under the action of the second vibration tray 28, and the upper cover of disposable syringe-driven filter at the tail end of the second feeding channel 29 can be grasped and mounted to the lower cover of disposable syringe-driven filter by the second loading arm 27.

Certainly, the innovation of the present invention is not limited to the above-mentioned embodiments, the skilled in the art can also make equivalent modification or replacement without violating the spirit of present invention, and those equivalent modification or replacement are both included within the scope of the claims of the application.

The invention claimed is:

1. An assembly machine for assembling a disposable syringe-driven filter, wherein the assembly machine comprises;
   a rack (5);
   an automatic controller (7);
   a rotating table (6) arranged on the rack (5);
   a lifting platform (10) provided above the rotating table (6);
   a first automatic loading mechanism (1) for loading a lower cover of the disposable syringe-driven filter, an automatic filter disc-sucking mechanism (2), a second automatic loading mechanism (24) for loading an upper cover of the disposable syringe-driven filter, and an automatic unloading mechanism (4) for unloading an assembled disposable syringe-driven filter are arranged on the lifting platform (10) above the rotating table (6);
   a first loading guiding rail (11) is arranged within the first automatic loading mechanism (1), one end of the first loading guiding rail (11) is fixed on the lifting platform (10) and another end is free; and
   a first loading sliding block (12) is arranged on the first loading guiding rail (11), and a first loading arm (13) is arranged on the lower end of first loading sliding block (12);
   wherein the first automatic loading mechanism (1), the automatic filter disc-sucking mechanism (2), the second automatic loading mechanism (24) and the automatic unloading mechanism (4) are arranged on the lifting platform (10) in a clockwise order; and
   the automatic controller (7) is electrically connected with the rotating table (6), the first automatic loading mechanism (1), the automatic filter disc-sucking mechanism (2), the second automatic loading mechanism (24) and the automatic unloading mechanism (4).

2. The assembly machine for assembling a disposable syringe-driven filter according to claim 1, wherein:
- a filter disc-sucking guiding rail (14) is arranged within the automatic filter disc-sucking mechanism (2), one end of the filter disc-sucking guiding rail (14) is fixed on the lifting platform (10) and another end is free,
- a filter disc-sucking sliding block (15) is arranged on the filter disc-sucking guiding rail (14), and a lower end of the filter disc-sucking sliding block (15) is provided with a filter disc-sucking end (16).

3. The assembly machine for assembling a disposable syringe-driven filter according to claim 1, wherein:
- a second loading guiding rail (25) is arranged within the second automatic loading mechanism (24), one end of the second loading guiding rail (25) is fixed on the lifting platform (10) and another end is free;
- a second loading sliding block (26) is arranged on the second loading guiding rail (25),
- and a second loading arm (27) is arranged on a lower end of the second loading sliding block (26).

4. The assembly machine for assembling a disposable syringe-driven filter according to claim 1, wherein:
- an unloading guiding rail (17) is arranged within the automatic unloading mechanism (4), one end of the unloading guiding rail (17) is fixed on the lifting platform (10) and another end is free;
- an unloading sliding block (18) is arranged on the unloading guiding rail (17), and a lower end of the unloading sliding block (18) is provided with an unloading arm (19).

5. The assembly machine for assembling a disposable syringe-driven filter according to claim 1, wherein: a plurality of positioning fixtures (20) are arranged on the rotating table (6).

6. The assembly machine for assembling a disposable syringe-driven filter according to claim 2, further comprising a filter disc punching mould (8), wherein the filter disc punching mould (8) is provided below the free end of the filter disc-sucking guiding rail (14).

7. The assembly machine for assembling a disposable syringe-driven filter according to claim 1, further comprising:
- a first feeding mechanism and
- a second feeding mechanism;
- wherein the first feeding mechanism is provided with a first vibration tray (21) and a first feeding channel (22), one end of the first feeding channel (22) is connected with the first vibration tray (21) and another end is arranged below the free end of the first loading guiding rail (11); the second feeding mechanism is provided with a second vibration tray (28) and a second feeding channel (29), and one end of the second feeding channel (29) is connected with the second vibration tray (28) and another end is provided below the free end of the second loading guiding rail (25).

8. The assembly machine for assembling a disposable syringe-driven filter according to claim 1, wherein:
- the first automatic loading mechanism (1) is arranged to load a lower cover of a disposable syringe-driven filter, under the control of the automatic controller (7), the lifting platform (10) lifts after the first loading arm (13) has grasped the lower cover of disposable syringe-driven filter placed outside the rotating table (6);
- the second automatic loading mechanism (24) is arranged to load an upper cover of a disposable syringe-driven filter, under the control of the automatic controller (7), the lifting platform (10) lifts after the second loading arm (27) has grasped the upper cover of disposable syringe-driven filter placed outside rotating table (6); and
- the automatic unloading mechanism (4) is arranged to unload an assembled disposable syringe-driven filter, under the control of the automatic controller (7), the lifting platform (10) lifts after the unloading arm (19) has grasped the finished disposable syringe-driven filter placed within the rotating table (6).

\* \* \* \* \*